(12) United States Patent
Singh

(10) Patent No.: US 8,898,506 B2
(45) Date of Patent: Nov. 25, 2014

(54) METHODS AND STRUCTURE FOR HARDWARE SERIAL ADVANCED TECHNOLOGY ATTACHMENT (SATA) ERROR RECOVERY IN A SERIAL ATTACHED SCSI (SAS) EXPANDER

(75) Inventor: Gurvinder Pal Singh, Dasuya (IN)

(73) Assignee: LSI Corporation, Milpitas, CA (US)

(*) Notice: Subject to any disclaimer, the term of this patent is extended or adjusted under 35 U.S.C. 154(b) by 304 days.

(21) Appl. No.: 13/557,437

(22) Filed: Jul. 25, 2012

(65) Prior Publication Data

US 2014/0032979 A1    Jan. 30, 2014

(51) Int. Cl.
G06F 11/00    (2006.01)

(52) U.S. Cl.
USPC ............................................. 714/4.1; 714/25

(58) Field of Classification Search
USPC .................................... 714/4.1, 25
See application file for complete search history.

(56) References Cited

U.S. PATENT DOCUMENTS

| | | | |
|---|---|---|---|
| 7,404,013 B1 * | 7/2008 | Masiewicz | ........................ 710/5 |
| 7,738,366 B2 | 6/2010 | Uddenberg et al. | |
| 7,739,432 B1 | 6/2010 | Shaw et al. | |
| 2005/0235072 A1 | 10/2005 | Smith et al. | |
| 2006/0041702 A1 | 2/2006 | Greenberger | |
| 2007/0011360 A1 | 1/2007 | Chang et al. | |
| 2007/0088974 A1 * | 4/2007 | Chandwani et al. | ............... 714/6 |
| 2007/0237174 A1 | 10/2007 | Chang et al. | |
| 2008/0086576 A1 * | 4/2008 | Schauer | ........................... 710/5 |
| 2008/0162773 A1 | 7/2008 | Clegg et al. | |
| 2012/0054404 A1 | 3/2012 | Day | |
| 2012/0144082 A1 | 6/2012 | Romero et al. | |

* cited by examiner

*Primary Examiner* — Sarai Butler
(74) *Attorney, Agent, or Firm* — Duft Bornsen & Fettig LLP

(57) ABSTRACT

Methods and structure for enhanced SAS expander functionality to store and forward buffered information transmitted from an initiator device to a target device and to process errors in control circuits of the expander without intervention from the general purpose programmable processor of the expander. A PHY of an expander is associated with control circuits that comprise buffering of commands to be forwarded to an end device directly coupled to the PHY. The control circuits locally process errors detected from the end device. The control circuits comprise a SATA host circuit adapted to communicate with a SATA end device to detect and clear error conditions and a SATA target circuit to communicate with one or more STP initiator devices to report and clear error conditions reported by the end device. The structures and methods may also service SAS connections (in addition to STP connections).

18 Claims, 8 Drawing Sheets

METHODS AND STRUCTURE FOR HARDWARE SERIAL ADVANCED TECHNOLOGY ATTACHMENT (SATA) ERROR RECOVERY IN A SERIAL ATTACHED SCSI (SAS) EXPANDER

BACKGROUND

1. Field of the Invention

The invention relates generally to error recovery in a serial protocol and more specifically relates to a customized circuit within a Serial Attached SCSI (SAS) expander to process SATA errors detected in a Serial Advanced Technology Attachment (SATA) end device coupled with the expander.

2. Related Patents

This patent is related to commonly owned U.S. Pat. No. 7,738,366 entitled METHODS AND STRUCTURE FOR DETECTING SAS LINK ERRORS WITH MINIMAL IMPACT ON SAS INITIATOR AND LINK BANDWIDTH which is hereby incorporated by reference and is herein referred to as the "Related Patent".

3. Discussion of Related Art

High speed serial communication systems have grown in popularity due to reduced cabling costs and the increased usable length enabled by a smaller cable with differential signaling. In particular, storage systems end devices often utilize SAS and/or SATA high speed serial communication media and protocols to provide reduced cost, improved cabling lengths, and high performance.

In some embodiments, a SAS switched fabric (SAS Service Delivery Subsystem) allows coupling of SATA storage devices to the SAS domain to provide lower cost alternatives for high performance storage devices (e.g., SATA disk drives). In such environments, the SATA Tunneling Protocol (STP) of the SAS specifications is used to allow an STP initiator to open a connection through the SAS switched fabric to a SATA storage device. The switched fabric comprises one or more SAS expanders providing switchable point to point connections between an initiator device (e.g., an STP initiator such as a host system storage controller) and a target device (e.g., a SATA storage device).

In general, once a connection is established between an initiator and a target, the switched fabric becomes, essentially, a passive conduit for passing information between the two end devices (i.e., between the connected initiator and target devices). Some SAS expanders have been enhanced to provide more intelligence than a mere "passive conduit". For example, the SAS expander discussed in the Related Patent is adapted to detect SAS link layer errors in physical links (PHYs) of the expander (and/or PHYs of other expanders in the fabric). The detected errors may be reported an initiator and the expander may take actions to reduce the possibility of further errors being generated on the failed link. Thus, the Related Patent detects an error and attempts to reduce the same error being reported multiple times.

Some recent developments have further enhanced SAS expanders to provide for speed matching buffering within the expander such that a higher speed device (e.g., a high speed initiator) may communicate with the expander at its full speed while the targeted end device is coupled with the expander at a slower speed. For example, some recent expanders from LSI Corporation include a feature named "End Device Frame Buffering" (EDFB) to provide, among other features, such speed matching buffering. When the EDFB features are in use, the enhanced expander has indicated to the higher speed initiator that the request has completed (e.g., a write request sending data from the initiator to the target). The associated data may reside within the EDFB enhanced expander awaiting forwarding to the addressed target device (operating at a slower data rate). If an error arises in forwarding such buffered data to the target device, software ("firmware") within the expander processes the detected error and performs appropriate error recovery to retry the failed transfer.

Since errors can occur with some frequency (errors recoverable by retry procedures) and since expanders can have a large number of ports (e.g., PHYs coupled with end target devices), the error recovery/retry processing in such an EDFB enhanced expander can create a significant processing load on the expander operation. A large number of errors from various ports would have to be tracked and recovered. Such processing in the expander overburdens the expander's firmware thus reducing overall performance of the entire system. In other words, the burden of error recovery processing in firmware of an EDFB enhanced SAS expander can negatively impact performance enhancements otherwise realized by the EDFB enhancements (or by similar buffering features in non-LSI enhanced SAS expanders).

Thus it is an ongoing challenge to improve error detection and recovery in a SAS expander that provides speed-matching buffering between initiator and target devices.

SUMMARY

The present invention solves the above and other problems, thereby advancing the state of the useful arts, by providing methods and structure for enhanced SAS expander functionality to store and forward buffered information transmitted from an initiator device to a target device and to process errors in control circuits of the expander without intervention from the general purpose programmable processor of the expander. A PHY of an expander may be associated with control circuits that comprise buffering of commands to be forwarded to an end device directly coupled to the PHY and to locally process errors detected from the end device. In particular, the control circuits comprise a SATA host circuit adapted to communicate with a SATA end device to detect and clear error conditions and a SATA target circuit to communicate with one or more STP initiator devices to report and clear error conditions reported by the end device. The structures and methods may also service SAS connections (in addition to STP connections).

In one aspect hereof, a SAS expander is provided, the expander comprises a host PHY adapted to couple with an STP initiator device and a target PHY adapted to directly couple with a SATA end device. The expander further comprises a buffer coupled with the host PHY and coupled with the target PHY to store commands received from the STP initiator device to be forwarded to the SATA end device. The expander further comprises a programmable controller adapted to establish a connection between the host PHY and the target PHY to permit the transfer of commands from the STP initiator device to the SATA end device through the buffer and a control circuit selectively coupled with the host PHY by the programmable controller and coupled with the target PHY. The control circuit is adapted to detect receipt of an error status from the SATA end device in response to a command forwarded from the buffer to the SATA end device. The control circuit is further adapted to communicate with the STP initiator device and with the SATA end device to clear the detected error status without involvement of the programmable controller.

Another aspect hereof provides a method operable in a SAS expander. The expander having one or more host PHYs each coupled with a corresponding STP initiator device and having a target PHY directly coupled to a SATA end device. The expander having a programmable controller and a control circuit separate from the programmable controller. The method comprises receiving, at a host PHY of the expander, a request from an STP initiator device to establish a connection to the SATA end device through the target PHY and establishing the requested connection between the host PHY and the target PHY through an intermediate buffer of the expander. The connection is established by operation of the programmable controller. The method further comprises storing one or more commands received from the STP initiator device in the buffer for later transmission to the end device. The commands are received and stored in the buffer by operation of the control circuit. The method then detects receipt of an error status from the SATA end device. The error status is received and detected by operation of the control circuit. The method then communicates with the STP initiator device (of the SAS expander) and with the SATA end device to clear the detected error status (in accord with SATA standard protocols). The communications are performed by operation of the control circuit without involvement of the programmable controller.

Still another aspect hereof provides a method operable in a SAS expander. The expander has one or more host PHYs each coupled with a corresponding STP initiator device and having a target PHY directly coupled to a SATA end device. The expander has a programmable controller and a control circuit separate from the programmable controller. The control circuit comprises a SATA host circuit coupled with the target PHY and a SATA target circuit coupled with each of the one or more host PHYs. The control circuit further comprises a buffer coupled with the SATA target circuit and coupled with the SATA host circuit. The method comprises establishing, by operation of the programmable controller, a connection between any of the one or more STP initiator devices and the SATA end device; storing, by operation of the SATA target circuit, in the buffer commands received from any of the one or more STP initiator device; and forwarding, by operation of the SATA host circuit, stored commands from the buffer to the SATA end device. The method then detects, by operation of the SATA host circuit, receipt of an error status from the SATA end device and, responsive to detecting receipt of the error status, the method then determines, by operation of the control circuit, a first portion of the one or more STP initiator devices that have commands stored in the buffer and determines a second portion of the one or more STP initiator devices that do not have commands stored in the buffer. The method further comprises storing, by operation of the SATA target circuit, further commands in the buffer from any of the STP initiator devices in the second portion and rejecting, by operation of the SATA target circuit, any further commands received from any of the STP initiators in the first portion until the error status is cleared. The method then clears, by operation of the control circuit, the detected error status without involvement of the programmable controller.

DETAILED DESCRIPTION OF THE DRAWINGS

Figure 1:
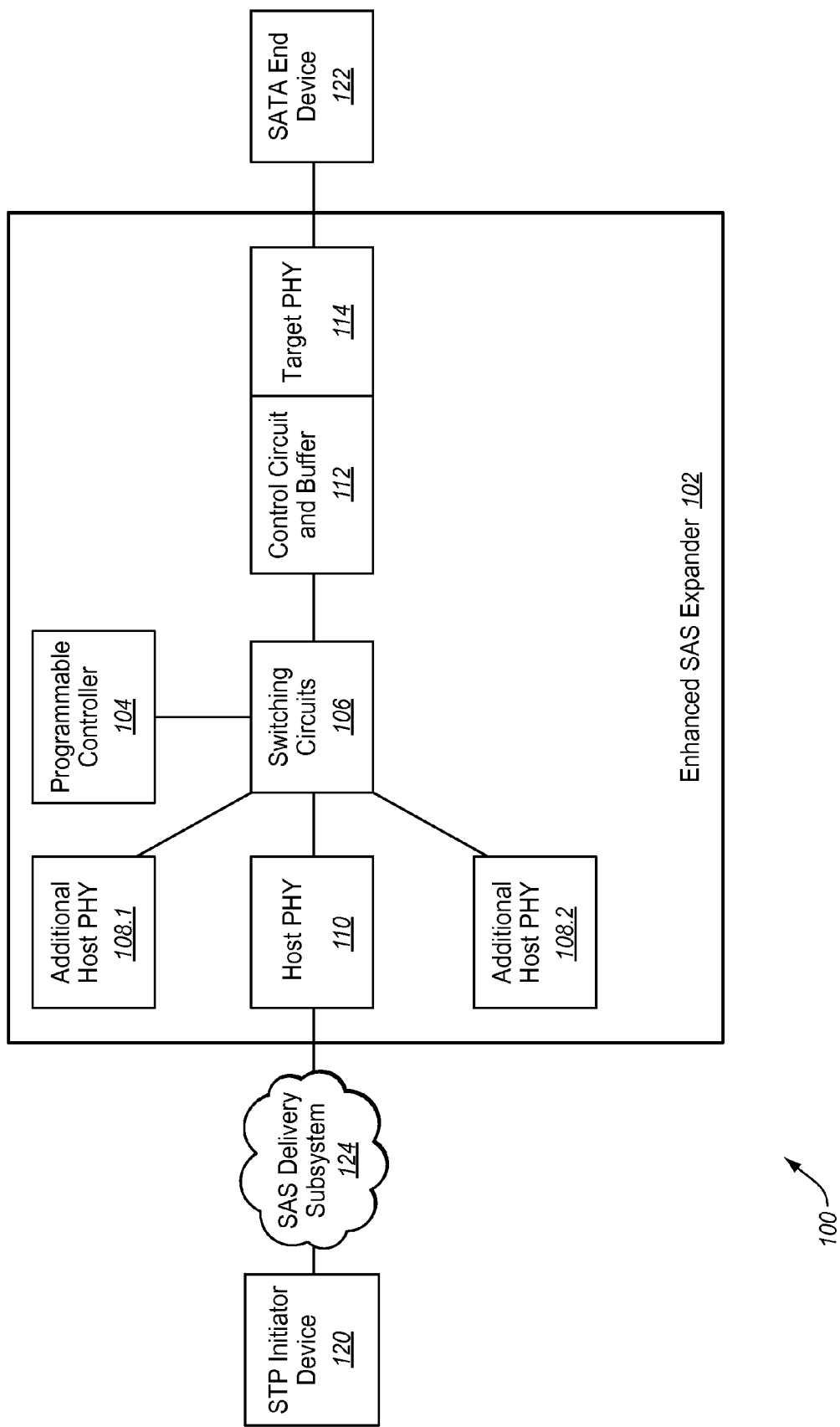
FIG. 1 is a block diagram of an exemplary system including a SAS expander enhanced in accordance with features and aspects hereof to provide buffering of commands and local error processing within control circuits without intervention of the programmable processor of the expander.

FIG. 1 is a block diagram of an exemplary system 100 enhanced in accordance with features and aspect thereof to provide for error processing within a SAS expander for an error status indicator detected in communications with a SATA end device directly coupled with the expander. System 100 comprises STP initiator device 120 coupled with SATA end device 122 through SAS delivery subsystem 124 (e.g., "SAS fabric") comprising at least enhanced SAS expander 102. STP initiator device may comprise any suitable device, component, or system that serves in the role of an initiator device utilizing STP when coupled to SAS delivery subsystem 124. For example, STP initiator device 120 may be a computer system such as a workstation or server having a suitable STP initiator controller device integrated therein. In some exemplary embodiments, STP initiator device 120 may be a storage controller such as a storage controller host bus adapter ("HBA") within a computing system or a storage controller integrated within a larger storage subsystem. SATA end device 122 may be any suitable end device (i.e., target device), component, or system compliant with the SATA protocols to permit coupling with a SATA host and/or with an STP initiator device in the context of a SAS domain. In some exemplary embodiments, SATA end device 122 may be a storage device such as a single disk drive, a solid state drive, or an entire storage subsystem.

Enhanced SAS expander 102 provides standard switching capabilities as provided by any SAS expander for selectively coupling any of its multiple physical links ("PHYs") to any other of its multiple PHYs. As noted above, in general, expander 102 may be considered part of SAS delivery subsystem 124. Specifically, SAS expander 102 is the expander of the SAS fabric that is directly coupled with SATA end device 122 (e.g., as distinct from other intermediate SAS expanders that may be part of the larger SAS delivery subsystem 124). In accordance with standard SAS expander functionality, expander 102 includes multiple PHYs such as host PHY 110, target PHY 114, and additional host PHYs 108.1 and 108.2.

Those of ordinary skill will recognize that any number of such PHYs may be present in expander 102 as appropriate for a particular application. Further, a PHY is designated herein as a "host" or "target" PHY simply to clarify the type of devices to which each PHY is coupled in the exemplary system of FIG. 1. Each PHY of expander 102 may be designed with equivalent features and may thus be used for any desired connection as appropriate to the particular SAS application. Thus, host PHY 110 and additional host PHYs 108.1 and 108.2 are shown as exemplary PHYs coupling SAS expander 102 with host devices such as STP initiator device 120. Such host devices may be directly coupled with a corresponding PHY of expander 102 or may be indirectly coupled as shown for PHY 110 through other components of a SAS delivery subsystem 124. Target PHY 114 represents a PHY of expander 102 that is directly coupled with a SATA end device 122.

In accordance with standard SAS expander architectures, expander 102 further comprises programmable controller 104 and associated switching circuit 106. Programmable controller 104 detects a request received over any PHY (e.g., host PHY 108.1, 108.2, and 110) to establish a connection with another PHY (e.g., target PHY 114). Responsive to such a request, programmable controller 104 configures switching circuit 106 to establish a temporary, switched, communications path (a "connection") between the PHY requesting such a connection and the identified target PHY. As is generally known in the art, programmable controller 104 is typically implemented as a suitably programmed general or special purpose processor with associated program and data memory. In some embodiments, programmable controller 104 may further comprise one or more application-specific integrated circuits to assist in the establishment of a requested connection between two PHY of the expander. Switching circuit 106 generally comprises multiplexer logic or other switching device circuitry programmable by operation of programmable controller 104 to electronically couple two PHYs within expander 102. Switching circuit 106 is often referred to as a "crossbar switch" but may be implemented in a variety of well-known circuit designs.

In accordance with features and aspects hereof, expander 102 is enhanced to further comprise control circuit and buffer 112. Control circuit and buffer 112 comprises circuits associated with target PHY 114 to provide performance enhancements in the processing of SATA protocol exchanges between STP initiator device 120 and SATA in device 122. It will be readily perceived by those of ordinary skill that features of control circuit and buffer 112 are also usable to enhance performance of SAS protocol exchanges. In some exemplary embodiments, each PHY of expander 102 may include control circuit and buffer 112 to permit each PHY to be enabled for use of these enhanced features when that PHY is directly coupled to an end device (e.g., a SATA end device or a SAS end device).

As noted above, control circuit and buffer 112 may include, among other functions, a speed matching buffer feature that allows expander 102 to communicate with high-performance STP initiator devices such as STP initiator device 120 using a first communication speed while communicating with a SATA end device such as end device 122 utilizing a second, slower communication speed. Control circuit and buffer 112 also provides for error processing such that errors encountered in exchanging information between an initiator and an end device through the speed matching buffer may be processed by expander 102 without burdening the processing capability of its programmable controller 104. Thus, an error status detected by control circuit and buffer 112 (such as may be generated by SATA end device 122) may be processed within expander 102 by appropriate communications directed by control circuit and buffer 112 without requiring intervention by programmable controller 104.

Figure 2:
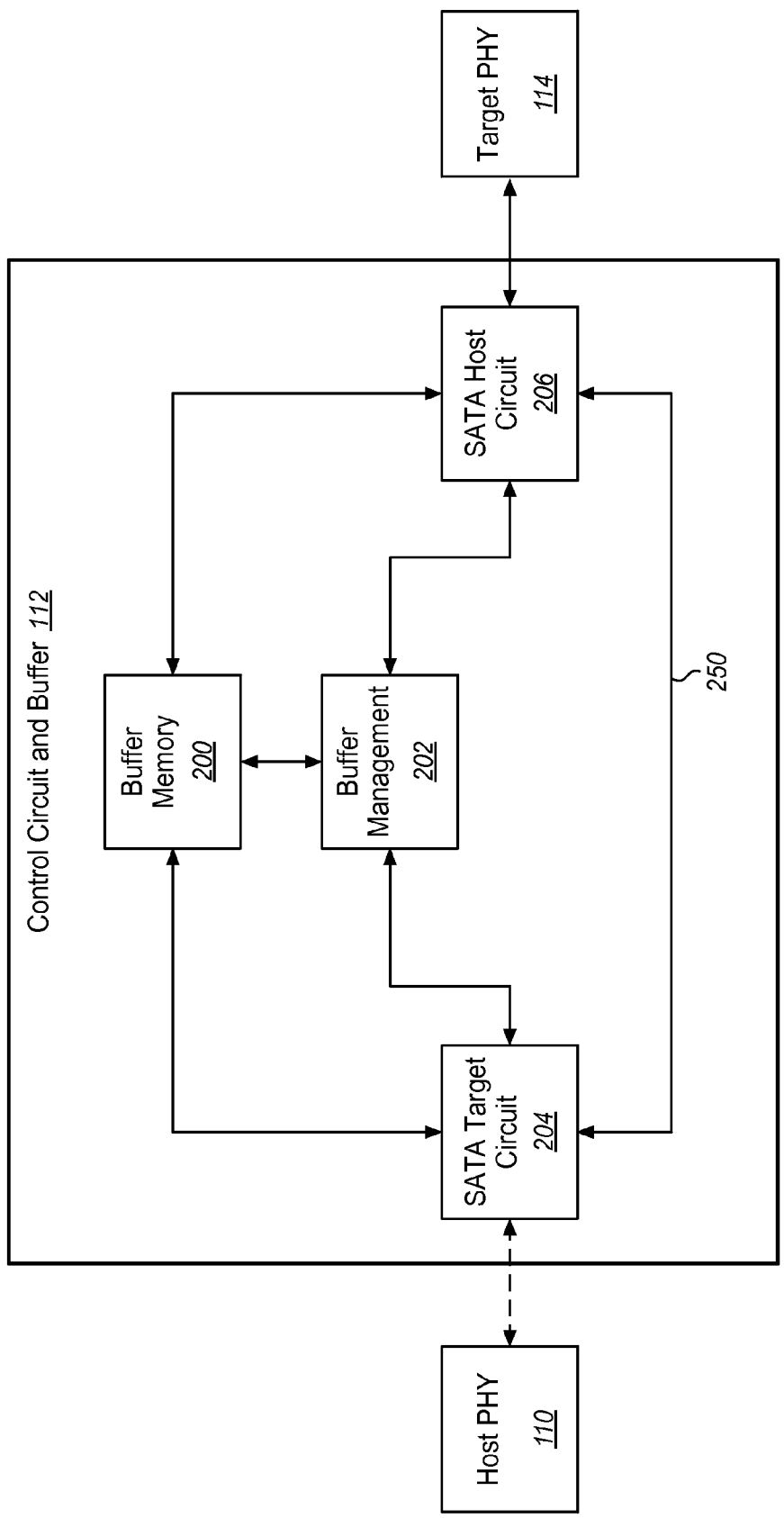
FIG. 2 is a block diagram providing exemplary additional details of the control circuits of the enhanced expander of FIG. 1.

FIG. 2 is a block diagram providing additional details of an exemplary embodiment of control circuit and buffer 112 of FIG. 1. Control circuit and buffer 112 may comprise buffer memory 200 used for storing commands and associated data exchanged between an STP initiator coupled through host PHY 110 and a SATA end device coupled through target PHY 114. Memory 200 may comprise any suitable memory device including, for example, random access memory ("RAM"). Buffer management 202 is any suitable circuit within control circuit and buffer 112 that serves to manage use of buffer memory 200. Commands and data stored in buffer memory 200 may be associated with meta-data to associate each stored piece of information with a corresponding initiator device, and/or with a corresponding target/end device, and/or with a corresponding PHY. Buffer management 202 therefore provides logic implementing services for allocating and freeing portions of buffer memory 200 and for managing associations of the allocated portions with particular devices in an established connection.

Where, as noted above, the expander establishes a connection between an STP initiator using a first speed (i.e., through host PHY 110) and a SATA target device using a second, slower speed (i.e., through target PHY 114), buffer memory 200 may also serve the function of a speed matching buffer. A further feature enabled by the use of buffer memory 200 arises in the ability of the enhanced expander to manage communications from a plurality of STP initiators transferring information to a single SATA end device (i.e. coupled through target PHY 114). By buffering such exchanges, the enhanced expander may indicate to an STP initiator device completion of a request when the information is stored in buffer memory 200. Thus, the STP initiator device is freed to continue processing other requests and performing other functions while the enhanced expander manages further protocol exchanges required to transfer the received information from buffer memory 200 to the SATA end device through target PHY 114.

Regardless of the speed utilized for coupling the expander with the connected devices and regardless of the number of initiators so connected to a target/end device, use of buffer memory 200 also allows for local management of detected errors in the exchanges by operation of the expander without intervention by the programmable processor of the expander. Buffer memory 200 stores commands and data exchanged between the two connected devices to allow the enhanced expander to locally manage detected errors by operation of control circuit and buffer 112 (i.e., without intervention by the programmable processor). By processing such detected errors within control circuit and buffer 112, the processing burden on the programmable processor of the expander may be thereby reduced. To coordinate communications and to detect and process such errors, control circuit and buffer 112 further comprises SATA target circuit 204 and SATA host circuit 206. In some exemplary embodiments, circuits 204 and 206 may include logic to selectively enable or disable their own operation to store and forward information through buffer memory 200. Communication path 250 represents a communication path in which circuits 204 and 206 are essentially bypassed to permit communications to pass more directly between target PHY 114 and host PHY 110. When features and aspects hereof are enabled, circuits 204 and 206 are configured to store and forward communications between PHY 110 and PHY 114 through buffer memory 200 and are adapted to detect and process errors in such communications.

In detecting and processing such errors, SATA target circuit 204 provides SATA target protocol processing for communications between the control circuit and an STP initiator coupled through host PHY 110 while SATA host circuit 206 provides SATA initiator protocol processing for communications between the control circuit and a SATA end device coupled through target PHY 114. During normal, error-free communications between an initiator and end device, commands and associated data are simply passed through buffer memory 200 (to achieve desired speed matching) without requiring substantial processing by SATA target circuit 204 and SATA host circuit 206 (other than monitoring for detected errors). However, if SATA host circuit 206 detects an error condition generated by the SATA end device coupled through target PHY 114, circuit 206 then assumes the role of a SATA host to process and clear the detected error status by communicating with the SATA end device coupled through target PHY 114. In like manner, when such an error status is detected, SATA target circuit 204 acts in the role of a SATA target or end device in communicating with one or more STP initiator devices coupled through host PHY 110 (or through other PHYs of the enhanced expander). The communications so performed by circuits 204 and 206 permit a detected error status to be appropriately reported and cleared by operation of control circuit and buffer 112 of the enhanced SAS expander without requiring intervention by the programmable processor of the expander.

In essence, SATA host circuit 206 communicates with the SATA end device through PHY 114 to detect the error status and to clear the error status in accordance with SATA protocols (but performed by SATA host circuit 206 within the expander). SATA target circuit 204 communicates with an STP initiator device through PHY 110 to report the detected error and to clear the error status from the perspective of the STP initiator device. Further, SATA target circuit 204 may communicate with each of one or more STP initiator devices (each through a corresponding PHY of the expander) to report and clear the detected error status. In other words, by operation of control circuit and buffer 112, the enhanced expander presents itself as a SATA end device to one or more STP initiators and presents itself as a SATA host device (i.e., an STP initiator device) to the SATA end device for purposes of detecting, reporting, and clearing an error status. Further, responsive to detecting an error status, control circuit and buffer 112 is adapted to remove commands and/or data from buffer memory 200 that was previously stored prior to detection of the error status. As noted above, buffer management 202 comprises data (meta-data) and associated logic for managing information in buffer memory 200 to aid in storing information and in removing previously stored information.

Those of ordinary skill in the art will readily recognize numerous additional and equivalent elements that may be present in a fully functional SAS expander and, in particular, in the control circuit and buffer memory logic components providing the enhanced features hereof in FIGS. 1 and 2. Such additional and equivalent elements are omitted herein for simplicity and brevity of this discussion.

Figure 3:
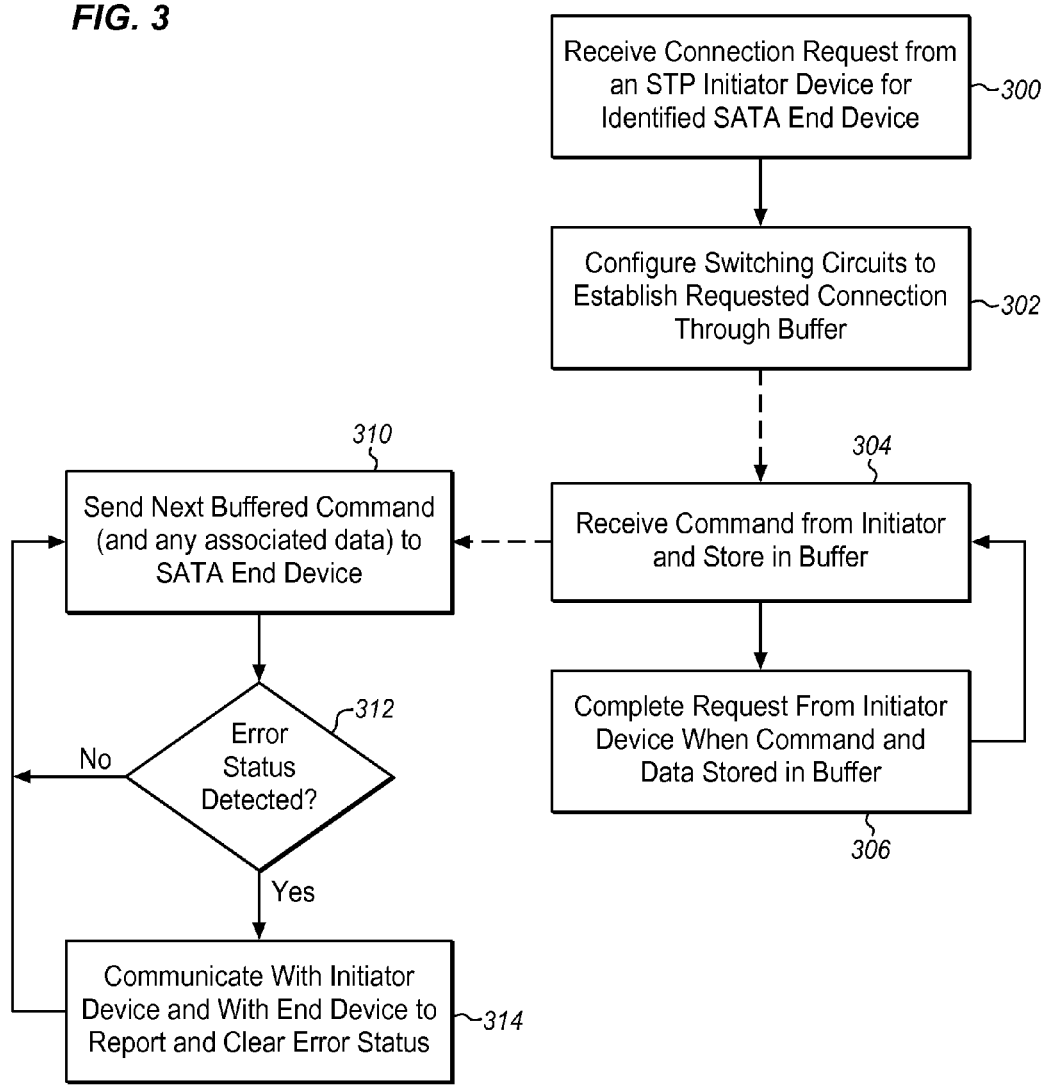
FIGS. 3 through 6C are flowcharts describing exemplary methods for operating a SAS expander enhanced in accordance with features and aspects hereof to provide buffering of commands and local error processing within control circuits without intervention of the programmable processor of the expander.

FIG. 3 is a flowchart describing an exemplary method for localized error detection and processing within an enhanced SAS expander in accordance with features and aspects hereof. The method of FIG. 3 may be operable in an enhanced SAS expander such as expander 102 of FIG. 1 and, more specifically, may be operable within customized control logic such as control circuit and buffer 112 of FIGS. 1, 2, and 7 to provide error detection and correction without intervention by a programmable processor of the expander in a SAS expander that buffers communications between devices. In particular, the method of FIG. 3 is operable, in part, within a SATA host circuit and a SATA target circuit implemented within the control logic circuitry associated with a PHY of the enhanced expander. As noted above, such custom control logic circuitry has been implemented, for example, by LSI Corporation and is referred to as End Device Frame Buffering ("EDFB") and may also be referred to by LSI's trade name "DataBolt™"

At step 300, the enhanced SAS expander receives a request to establish a new connection between a requesting STP initiator device and an identified SATA end device. The general-purpose programmable processor of the enhanced SAS expander processes such a request (typically encoded as a SAS Open Address Frame). At step 302, the programmable processor of the SAS expander establishes the requested connection by configuring switching circuits (e.g., "crossbar" switching features of the expander) to communicatively couple a host PHY of the expander (from which the connection request was received) with a target PHY of the expander (to which the identified SATA end device is directly coupled). Processing of steps 300 and 302 are inherent steps for processing in any SAS expander operation and thus are well understood by those of ordinary skill in the art.

Steps 304 and 306 represent iterative, ongoing processing by the SATA target circuit of control logic of the enhanced expander. Processing of steps 304 and 306 proceed asynchronously following establishment of the requested connection by step 302 as indicated by the dashed line arrow coupling step 302 to step 304. At step 304, the SATA target circuit receives a next command (and any associated data) from the STP initiator coupled with the expander through the host PHY. Step 304 also utilizes buffer management features of the control circuitry of the enhanced expander to store the received command (and associated data) in a buffer memory of the control logic of the enhanced expander. As noted above, the SATA target circuit within the control circuits of the enhanced SAS expander may cooperate with buffer management logic circuits of the control logic to allocate a next portion of the buffer memory for storage of the received command (and associated data). Further, as also noted above, receiving and storing the command and associated data in the buffer memory of the control circuits of the enhanced expander allows the buffer memory to serve as a speed matching buffer where communications between the expander and the STP initiator device proceed at a first speed and communications between the identified data and device and the expander proceed at a second, slower speed. At step 306, the received request (command and associated data) may be indicated as completed by the SATA target circuit returning an appropriate completion status to the STP initiator through the host PHY of the enhanced expander. In other words, the SATA target circuit of the control logic of the enhanced expander sends to the requesting STP initiator an appropriate completion status indicating successful transfer of the command (and associated data). Processing then continuous looping back to step 304 to await receipt of the next command (and associated data) from the STP initiator.

As the SATA target circuit asynchronously continues background processing at steps 304 and 306 to receive and store additional commands and associated data from one or more STP initiator devices, steps 310 through 314 proceed asynchronously (as indicated by the dashed arrow coupling step 304 to step 310). Steps 310 through 314 are iteratively operable within the control circuits of the enhanced SAS expander to forward received commands and associated data to the SATA end device and to detect and process any error in that forwarding process. At step 310, a SATA host circuit of the control logic of the enhanced expander awaits and retrieves a next buffered command (and associated data) from the buffer memory of the control logic circuits and sends or forwards the retrieved command and associated data to the SATA end device through the target PHY of the enhanced expander. At step 312, the SATA host circuit of the control logic of the enhanced expander determines whether the transfer was successful or resulted in an error status. If step 312 detects no error status (i.e., successful completion in forwarding the retrieved command and associated data to the SATA end device), processing continues looping back to step 310 to retrieve a next buffered command (and associated data) and to forward the next retrieved command to the SATA end device. If the SATA target circuit at step 312 detects an error status returned from the SATA end device, step 314 communicates with the STP initiator device (using the SATA target circuit) and with the SATA end device (using the SATA host circuit) to report, and appropriately clear, the detected error status. In general, the SATA target circuit of the control logic of the enhanced expander reports to the appropriate STP initiator device or devices that the detected error status occurred. The SATA target device further communicates with the appropriate STP initiator device or devices to indicate when the detected error status has been cleared. Substantially simultaneously, the SATA host circuit of the control logic of the enhanced expander communicates with the SATA end device to clear the detected error status. The communications include receipt of information from the SATA end device indicative that the error status has been cleared. When the error status has been successfully cleared, the SATA target circuit, as discussed above, communicates the clearing of the error status condition to the appropriate STP initiator device or devices. Processing then continuous looping back to step 310 to retrieve a next buffer command and associated data from the buffer memory and to forward such a next retrieved command to the SATA end device.

Figure 4:
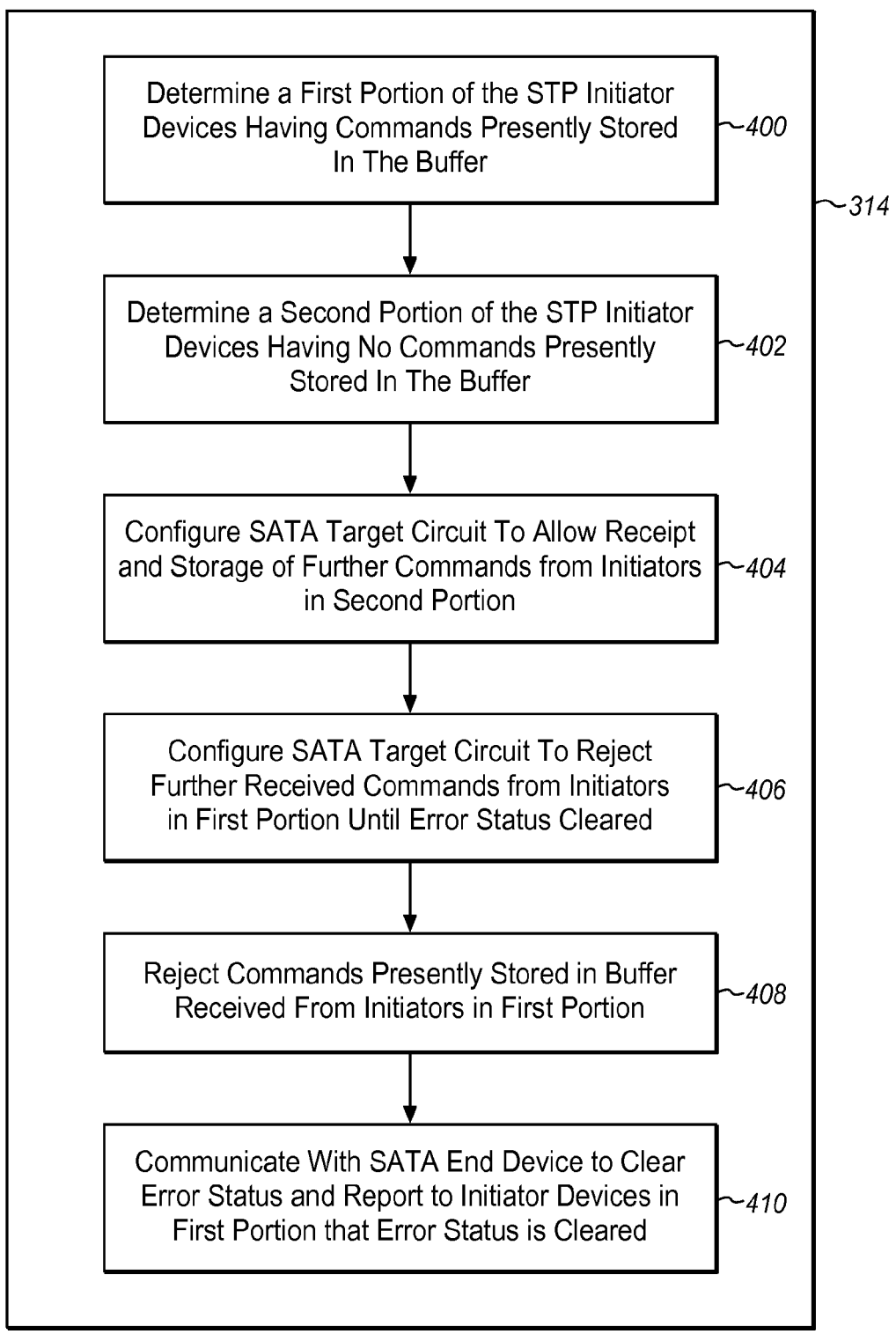

FIG. 4 is a flowchart describing exemplary additional details of the processing of step 314 of FIG. 3 to process a detected error status by communicating with both the affected STP initiator devices and with the SATA end device. At step 400, control logic circuits of the enhanced SAS expander determine a first portion of one or more STP initiator devices. STP initiator devices in the first portion are identified as having commands (and any associated data) presently stored in the buffer memory of the control logic circuits. Such buffered commands and data have yet to be transmitted to the SATA end device through the target PHY at the time the error status is detected. In like manner, step 402 conversely determines a second portion of the one or more STP initiator devices that have no commands stored in the buffer memory of the control logic circuits to be sent to the SATA end device that reported the error status. STP initiator devices in the identified first portion may require communications from the enhanced SAS expander to report the detected error status and to attempt to clear the reported error status. STP initiator devices identified in the second portion have no commands presently pending at the time the error status was detected and thus require no specific communications to report the error status or to attempt to clear the reported error status. Rather, the SATA target circuit of the control logic circuits of the enhanced expander may continue to receive, store, and forward new commands and associated data from the one or more STP initiator devices in the second portion. By contrast, in accordance with the SATA protocols, each STP initiator device in the first portion requires communications reporting the error status and communications to clear a detected error status. Step 404 therefore configures the SATA target circuit of the control circuits of the enhanced SAS expander to allow continued receipt, storage, and forwarding of further commands from any STP initiator device in the second portion. Step 406 also configures the SATA target circuit of the control circuits of the enhanced as expander to reject any further received commands from STP initiator devices identified in the first portion until such time as the detected error status is cleared. Further, step 408 communicates with appropriate STP initiator devices to reject any commands presently stored in the buffer that were received from STP initiator devices identified as in the first portion. In other words, commands and associated data presently stored in the buffer memory of the control logic circuits of enhanced expander at the time the error status was detected will be removed and the SATA target circuit will appropriately communicate with associated STP initiator devices to indicate that the removed, buffered commands have been rejected (e.g., due to the detected error status). Step 410 then utilizes the SATA host circuit of the control logic circuits of the enhanced SAS expander to communicate with the SATA end device to clear the detected error status and to indicate to the SATA target circuit that the error status has been cleared. Once the error status has been cleared and all previously buffered commands (buffered before detection of the error status) have been removed, normal, error-free processing may then continue within the enhanced SAS expander.

Figure 5:
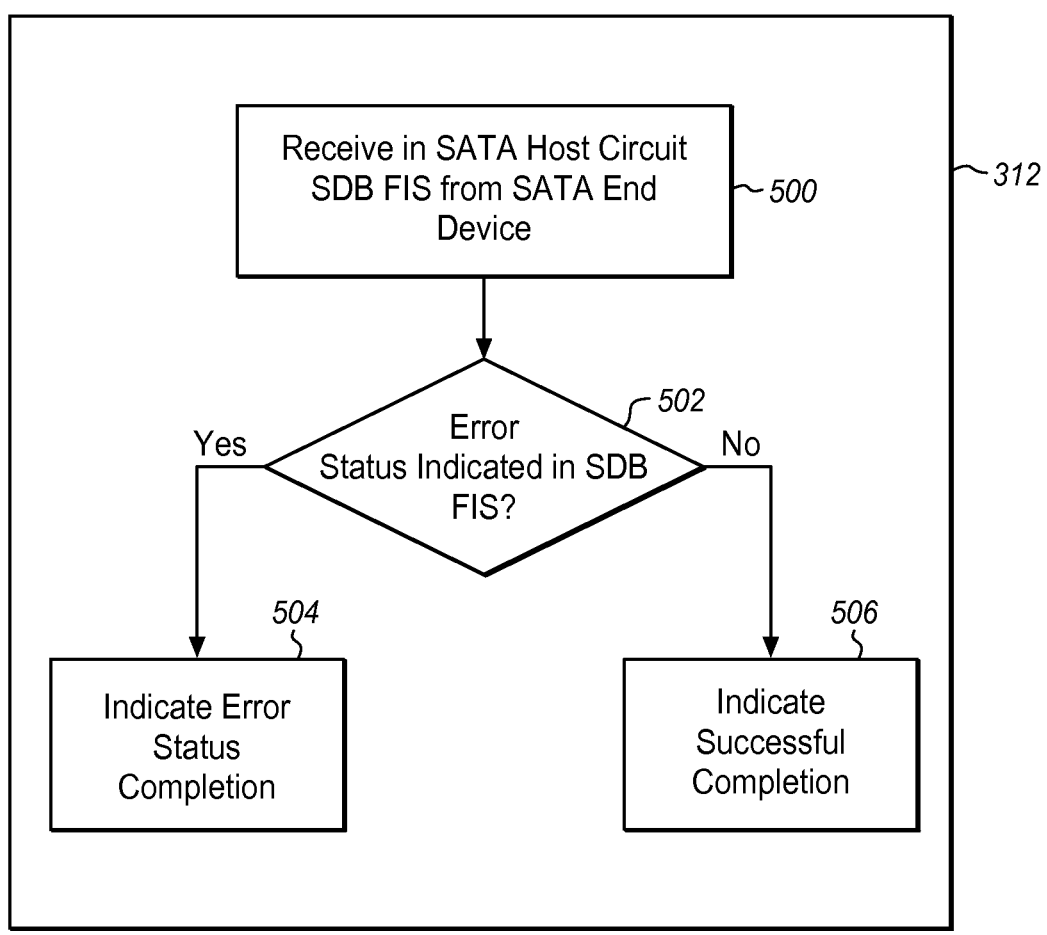

FIG. 5 is a flowchart describing exemplary additional details for the processing of step 312 to detect whether a forwarded command (and associated data) resulted in a successful completion or an error status. At step 500, the SATA host circuit of the control logic circuits of the enhanced SAS expander receives a completion status formatted as a Set Device Bits (SDB) Frame Information Structure (FIS) from the SATA end device. At step 502, the SATA host circuit determines whether the received SDB FIS indicates that the transmitted command and associated data was received and processed successfully or was received and/or processed in a manner that resulted in an error status. If an error status is detected by step 502, step 504 indicates detection of an error status by operation of the SATA host circuit and informs the SATA target circuit of the control logic circuits of the enhanced expander of the detected error. If step 502 determines that no error status was detected in the SDB FIS, at step 506, the SATA host circuit indicates successful completion of the forwarded command and associated data allowing normal operation to continue.

Figure 6A:
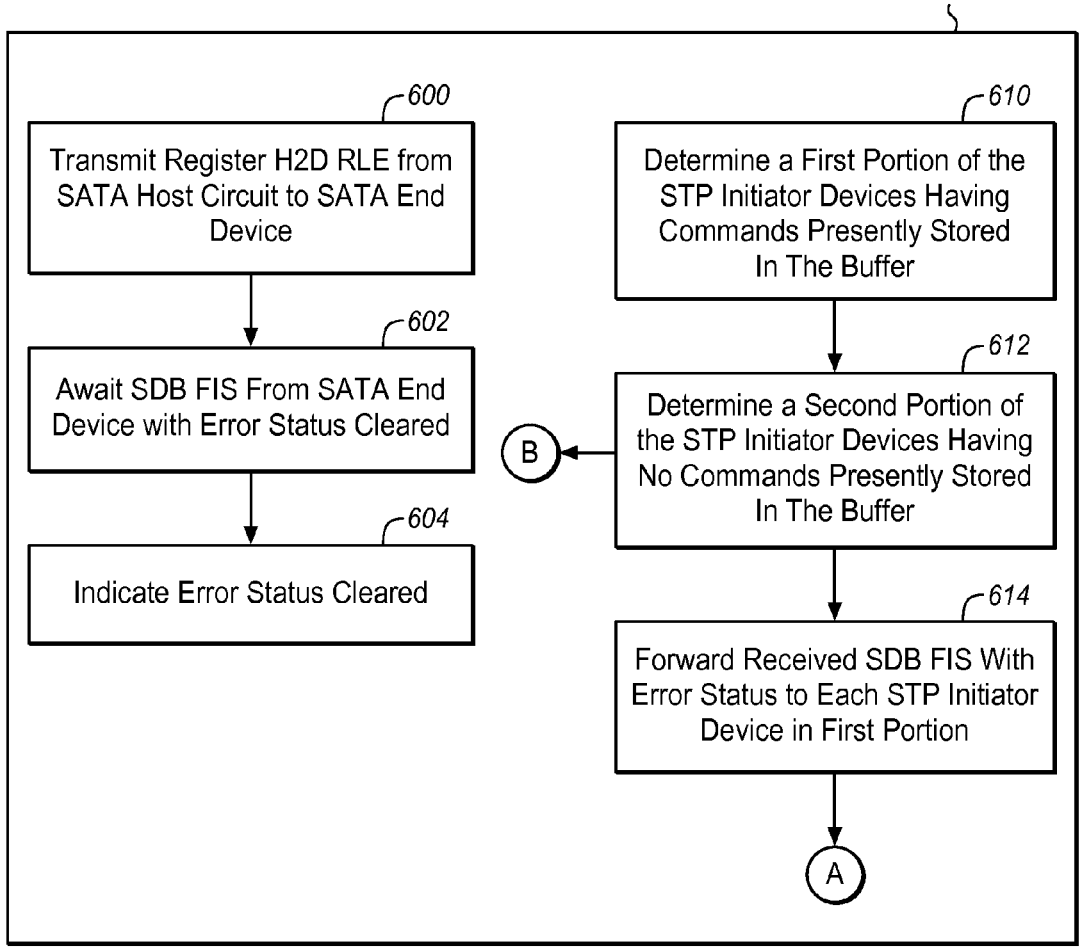
Figure 6B:
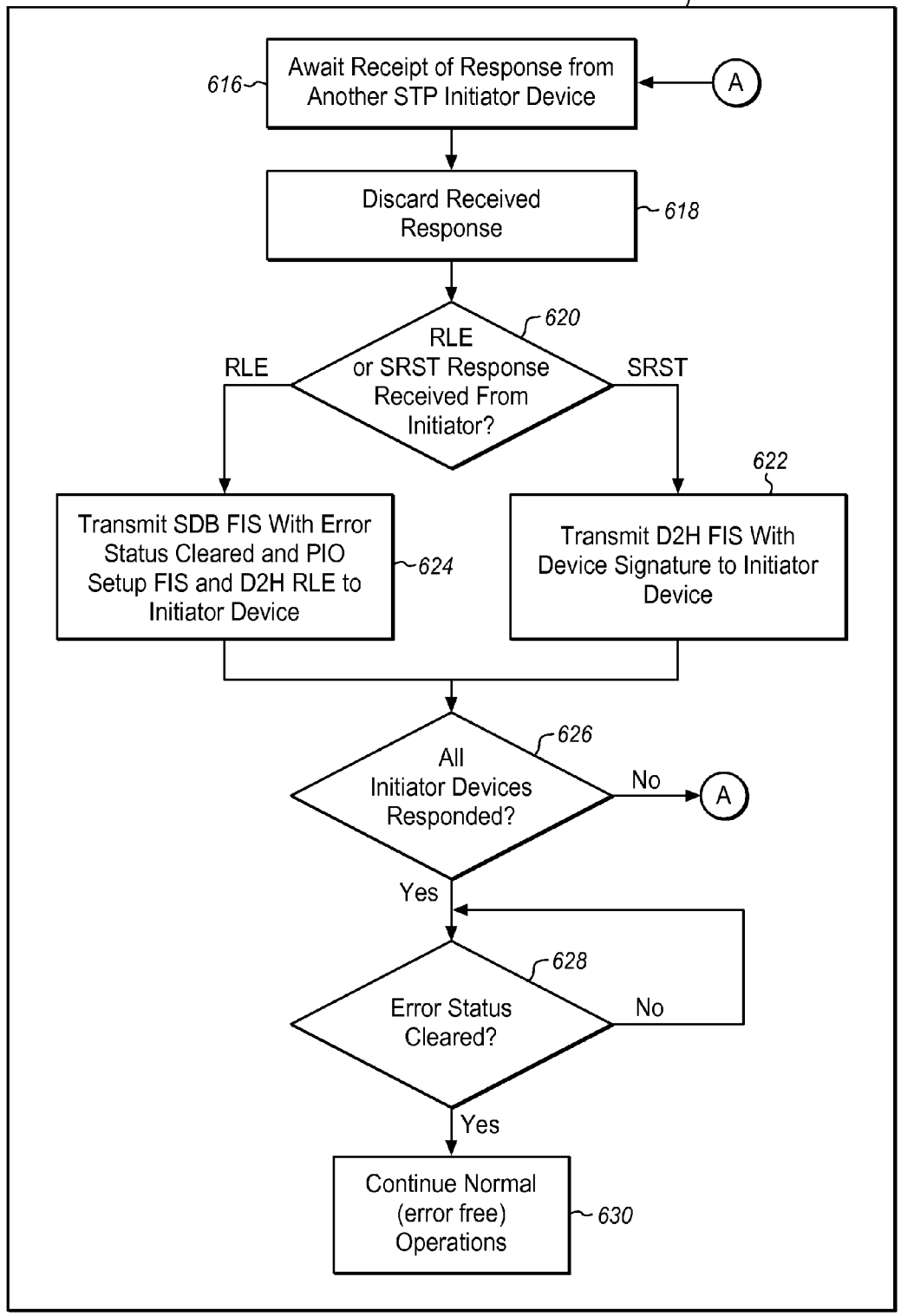
Figure 6C:
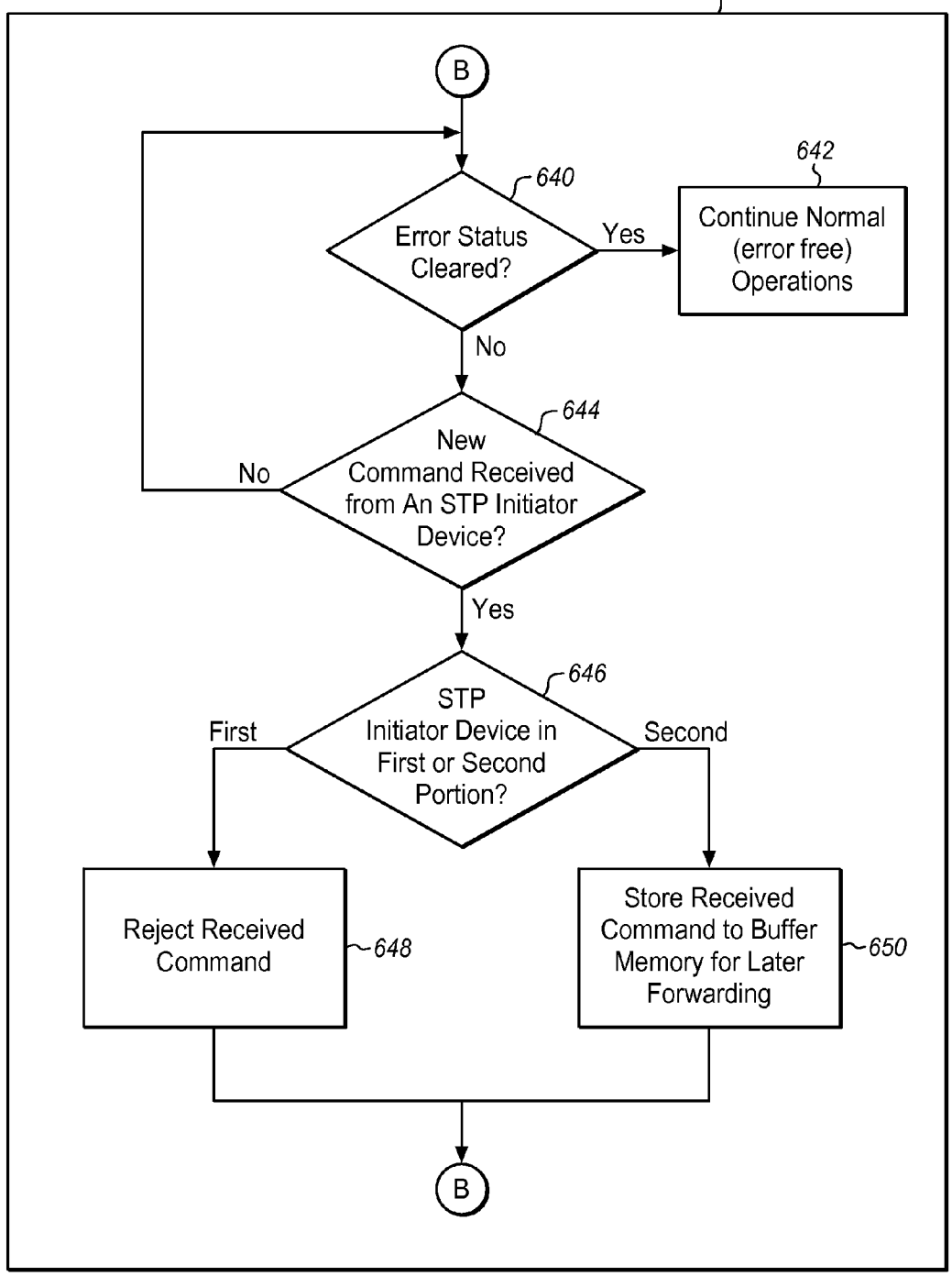

FIGS. 6A, 6B, and 6C represent a flowchart describing exemplary additional details for processing of step 314 of FIG. 3 to communicate with one or more STP initiator devices and with the SATA end device to report and clear error conditions detected in the store and forward processing of commands. Step 314, as discussed above, is operable in response to detection of an error status reported by the SATA end device and detected by the SATA host circuit of the control logic circuits of the enhanced SAS expander.

Steps 600 through 604 of FIG. 6A represent processing to communicate with the SATA end device to clear the detected error status. In accordance with SATA standards, step 600 transmits a Register Host to Device (H2D) Read Log Ext (RLE) from the SATA host circuit of the control circuits to the SATA end device (through the target PHY). Step 602 then awaits receipt in the SATA host circuit of an SDB FIS from the SATA end device indicating that the error has been cleared. Step 604 then indicates that the error status has been cleared to allow normal operations to resume. Substantially in parallel with steps 600 through 604, steps 610-614 (and steps 620-630 of FIG. 6B and steps 640-650 of FIG. 6C) are operable to communicate with STP initiator devices to report the detected error status and to clear the error condition with each affected STP initiator. In particular, step 610 of FIG. 6A determines a first portion of the STP initiator devices that presently have commands (and associated data) stored in the buffer memory directed to the SATA end device that reported the error. Step 612, conversely determines a second portion of the STP initiators that presently have no commands and data stored in the buffer memory (i.e., presently have no commands pending for the SATA end device).

Having so determined the first and second portions of the STP initiator device, concurrent processing at step 640 of FIG. 6C (discussed below) commences to process new commands received from the STP initiator devices. Concurrent with that processing, step 614 forwards the received SDB FIS with the detected error status to each STP initiator device associated with the first portion. The forwarded SDB FIS thus reports the detected error status to each STP initiator device that has commands presently pending with the SATA end device (i.e., presently in process or stored in the buffer memory awaiting forwarding to the SAAT end device). At step 616 (continuing at label "A" on FIG. 6B), the SATA target circuit of the enhanced expander awaits receipt of a response from an STP initiator device in the first portion (to which the error status was reported at step 614). The received response, according to SATA standards, is either a Register H2D RLE or a Soft Reset (SRST). The received response is discarded at step 618 (because the appropriate response to the SATA end device has already been transmitted by the SATA host circuit of the enhanced expander as discussed above at step 600 of FIG. 6A). Step 620 then determines whether the response from one of the STP initiator devices is a Register H2D RLE or a Soft Reset (SRST). If the response was an RLE, step 624 transmits an appropriate response to the STP initiator device from the SATA target circuit. In accordance with SATA protocols, an appropriate response comprises transmission of an SDB FIS with the error status cleared, a PIO Setup FIS, and a Register Device to Host (D2H) RLE. If the response from the STP initiator device was a Soft Reset (SRST) as determined by step 620, step 622 constructs and transmits an appropriate response to the STP initiator— namely, a D2H FIS with the device signature in accordance with the SATA protocol standards. Thus, the SATA target circuit of the enhanced expander constructs an appropriate response to the STP initiator device and transmits the response on behalf of and instead of the SATA end device.

In both cases (following steps 622 and 624), step 626 determines whether a response has been received from each of the ST initiator devices in the first portion. If not, processing continues looping back to step 616 to await a response from another STP initiator device in the first portion (another device to which the error status was reported). If all STP initiator devices in the first portion have responded, step 628 awaits an indication that the error status has been cleared such that normal (error free) operation may resume at step 630.

Substantially concurrent with the above processing, steps 640 through 650 are operable to receive new commands (and associated data) from any of the one or more initiator devices until the error status has been cleared. Step 640 determines whether the error status has been cleared. If so, normal (error free) operations continue at step 642. Otherwise, step 644 determines whether a new command has been received from one of the STP initiator devices. If not, processing continues looping through steps 640 and 644 until a new command is received or until the error status has been cleared to resume normal processing. Upon receipt of a new command, step 646 determines whether the new command is received from an STP initiator device in the first portion or in the second portion. If the new command is from a device in the first portion (and the error status is not yet cleared), step 648 rejects the new command indicating that the error status condition is not yet cleared. If the new command is from a device in the second portion, step 650 stores the new command (and associated data) in the buffer memory for eventual forwarding to the SATA end device. Since devices in the second portion had no presently pending commands in process or queued for the SATA end device, they received no notification of the error status and the status should not affect their continued operation. In both cases, processing continues looping back to step 640 (label "B") to await receipt of another command or the clearing of the error status to allow resumption of normal (error free) operation.

Those of ordinary skill in the art will readily recognize numerous equivalent and additional steps that may be present in fully functional methods such as the methods of FIGS. 3 through 6C. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached SCSI (SAS) expander comprising:
a host physical link (PHY) adapted to couple with a Serial Advanced Technology Attachment (SATA) Tunneling Protocol (STP) initiator device;
a target PHY adapted to directly couple with a SATA end device;
a buffer coupled with the host PHY and coupled with the target PHY to store commands received from the STP initiator device to be forwarded to the SATA end device;
a programmable controller adapted to establish a connection between the host PHY and the target PHY to permit the transfer of commands from the STP initiator device to the SATA end device through the buffer; and
a control circuit selectively coupled with the host PHY by the programmable controller and coupled with the target PHY, the control circuit adapted to detect receipt of an error status from the SATA end device in response to a command forwarded from the buffer to the SATA end device, the control circuit further adapted to communicate with the STP initiator device and with the SATA end device to clear the detected error status without involvement of the programmable controller.

2. The expander of claim 1 wherein the control circuit further comprises:
a SATA host circuit coupled with the target PHY and coupled with the buffer; and
a SATA target circuit coupled with the host PHY and coupled with the buffer,
wherein the SATA host circuit is adapted to detect receipt of the error status from the SATA end device.

3. The expander of claim 2
wherein the SATA host circuit is further adapted to communicate with the SATA end device to clear the error status according to a SATA protocol, and
wherein the SATA target circuit is further adapted to communicate with the STP initiator device to report the detected error status and to discard any commands stored in the buffer prior to detection of the error status.

4. The expander of claim 2
wherein the error status is received by the control circuit from the SATA end device as a SATA Set Device Bits (SDB) Frame Information Structure (FIS) having an error status indicator set.

5. The expander of claim 4
wherein the SATA host circuit, responsive to receipt of the SDB FIS, is further adapted to transmit a Register Host to Device (H2D) FIS comprising a Read Log Ext (RLE) command to the SATA end device and is further adapted to await receipt from the SATA end device of an SDB FIS having the error status indicator cleared.

6. The expander of claim 4 wherein the SATA target circuit, responsive to receipt of the SDB FIS from the SATA end device, is further adapted to forward the received SDB FIS to the STP initiator device and is further adapted to await either receipt from the STP initiator device of a Register H2D FIS comprising an RLE command from the STP initiator device or receipt from the STP initiator device of a Register H2D FIS having a Soft Reset (SRST) bit set, wherein the SATA target circuit, responsive to receipt of the Register H2D FIS comprising the RLE command, is further adapted to discard the received Register H2D FIS comprising the RLE command and is further adapted to transmit an SDB FIS having an error indicator cleared and is further adapted to transmit a PIO Setup FIS to the STP initiator device and is further adapted to transmit a Register Device to Host (D2H) FIS comprising an RLE command to the STP initiator device, and wherein the SATA target circuit, responsive to receipt of the Register H2D FIS having the SRST bit set, is further adapted to discard the Register H2D FIS having the SRST bit set and is further adapted to transmit a Register D2H FIS comprising a Device Signature to the STP initiator device.

7. The expander of claim 6 wherein the Register D2H FIS comprising the RLE command further comprises information previously received from the SATA end device, wherein the PIO Setup FIS further comprises information previously received from the SATA end device, and wherein the Register D2H FIS comprising the Device Signature further comprises information previously received from the SATA end device.

8. The expander of claim 1 wherein the host PHY is adapted to couple with the STP initiator device at a first speed, wherein the target PHY is adapted to couple with the SATA end device at a second speed that is slower than the first speed, and wherein the buffer is a speed matching buffer to permit transfer of commands from the STP initiator device to the SATA end device using the first speed in communications between the expander and the STP initiator device and using the second speed in communications between the expander and the SATA end device.

9. The expander of claim 1 further comprising:

one or more additional host PHYs, each additional host PHY coupled with the buffer and coupled with the control circuit each additional host PHY adapted to couple with a corresponding STP initiator device, wherein the programmable controller is further adapted to establish a connection between any of the host PHYs and the target PHY to permit the transfer of commands from any of the STP initiator devices to the SATA end device through the buffer, wherein the control circuit further comprises:

a SATA host circuit coupled with the target PHY and coupled with the buffer; and a SATA target circuit coupled with each of the host PHYs and coupled with the buffer, wherein the SATA host circuit is adapted to detect receipt of the error status from the SATA end device.

10. The expander of claim 9 wherein the SATA host circuit is further adapted to communicate with the SATA end device to clear the error status according to a SATA protocol, and wherein the SATA target circuit is further adapted to communicate with one or more STP initiator devices coupled with one or more of the host PHYs to report the detected error status and to further adapted to discard any commands stored in the buffer that were received from any of the one or more STP initiator devices prior to detection of the error status.

11. The expander of claim 9 wherein the SATA target circuit, responsive to detecting receipt of the error status by the SATA host circuit, is further adapted to determine a first portion of the plurality of STP initiator devices that have commands stored in the buffer and to determine a second portion of the plurality of STP initiator devices that do not have commands stored in the buffer, wherein the SATA target circuit, responsive to determining the first and second portions, is further adapted to store further commands in the buffer from any of the STP initiator devices in the second portion, and wherein the SATA target circuit, responsive to determining the first and second portions, is further adapted to reject any further commands from any of the STP initiators in the first portion until the error status is cleared.

12. A method operable in a Serial Attached SCSI (SAS) expander, the expander having one or more host physical links (PHYs) each coupled with a corresponding Serial Advanced Technology Attachment (SATA) Tunneling Protocol (STP) initiator device and having a target PHY directly coupled to a SATA end device, the expander having a programmable controller and a control circuit separate from the programmable controller, the method comprising:

receiving, at a host PHY of the expander, a request from an STP initiator device to establish a connection to the SATA end device through the target PHY;

establishing the requested connection between the host PHY and the target PHY through an intermediate buffer of the expander, wherein the connection is established by operation of the programmable controller;

storing one or more commands received from the STP initiator device in the buffer for later transmission to the end device, wherein the commands are received and stored in the buffer by operation of the control circuit;

detecting receipt of an error status from the SATA end device, wherein the error status is received and detected by operation of the control circuit; and communicating with the STP initiator device and with the SATA end device to clear the detected error status, wherein the communications are performed by operation of the control circuit without involvement of the programmable controller.

13. The method of claim 12 wherein the control circuit further comprises a SATA host circuit coupled with the target PHY and coupled with the buffer and further comprises a SATA target circuit coupled with the one or more host PHYs and coupled with the buffer, wherein the step of storing received commands further comprises receiving and storing the commands by operation of the SATA target circuit, wherein the step of detecting receipt of the error status further comprises detecting receipt of the error status by operation of the SATA host circuit, and wherein the step of communicating further comprises:

communicating with the one or more STP initiator devices by operation of the SATA target circuit; and communicating with the SATA end device by operation of the SATA host circuit.

14. The method of claim 12
wherein the control circuit further comprises a SATA host circuit coupled with the target PHY and coupled with the buffer and further comprises a SATA target circuit coupled with the one or more host PHYs and coupled with the buffer, each host PHY coupled with a corresponding one of one or more STP initiator devices,
wherein the step of detecting further comprises receiving the error status in the SATA host circuit;
wherein the step of communicating further comprises:
  determining, by operation of the control circuit, a first portion of the one or more STP initiator devices that have presently commands stored in the buffer;
  determining, by operation of the control circuit, a second portion of the one or more STP initiator devices that do not have commands presently stored in the buffer;
  allowing, by operation of the SATA target circuit, storage of further commands in the buffer received from any of the STP initiator devices in the second portion;
  rejecting, by operation of the SATA target circuit, any commands presently stored in the buffer that were received from any of the STP initiators in the first portion;
  rejecting, by operation of the SATA target circuit, any further commands from any of the STP initiators in the first portion until the error status is cleared; and
  communicating, by operation of the SATA host circuit, with the SATA end device to clear the error status and to receive information from the SATA end device indicative that the error status is cleared.

15. A method operable in a Serial Attached SCSI (SAS) expander, the expander having one or more host physical links (PHYs) each coupled with a corresponding Serial Advanced Technology Attachment (SATA) Tunneling Protocol (STP) initiator device and having a target PHY directly coupled to a SATA end device, the expander having a programmable controller and a control circuit separate from the programmable controller, the control circuit comprising a SATA host circuit coupled with the target PHY, the control circuit further comprising a SATA target circuit coupled with each of the one or more host PHYs, the control circuit further comprising a buffer coupled with the SATA target circuit and coupled with the SATA host circuit, the method comprising:
  establishing, by operation of the programmable controller, a connection between any of the one or more STP initiator devices and the SATA end device;
  storing, by operation of the SATA target circuit, in the buffer commands received from any of the one or more STP initiator device;
  forwarding, by operation of the SATA host circuit, stored commands from the buffer to the SATA end device;
  detecting, by operation of the SATA host circuit, receipt of an error status from the SATA end device;
  responsive to detecting receipt of the error status, determining, by operation of the control circuit, a first portion of the one or more STP initiator devices that have commands stored in the buffer and a second portion of the one or more STP initiator devices that do not have commands stored in the buffer;
  storing, by operation of the SATA target circuit, further commands in the buffer from any of the STP initiator devices in the second portion;
  rejecting, by operation of the SATA target circuit, any further commands received from any of the STP initiators in the first portion until the error status is cleared; and
  clearing, by operation of the control circuit, the detected error status without involvement of the programmable controller.

16. The method of claim 15
wherein the step of detecting further comprises detecting receipt from the SATA end device of a SATA Set Device Bits (SDB) Frame Information Structure (FIS) having an error status indicator set, and
wherein the step of clearing further comprises:
  transmitting, by operation of the SATA host circuit, a Register Host to Device (H2D) FIS comprising a Read Log Ext (RLE) command to the SATA end device; and
  awaiting, by operation of the SATA host circuit, receipt from the SATA end device of an SDB FIS having the error status indicator cleared.

17. The method of claim 16
wherein the step of clearing further comprises:
  responsive to detecting receipt of the SDB FIS from the SATA end device, forwarding, by operation of the SATA target circuit, the received SDB FIS each of the one or more STP initiator devices in the first portion, and
  awaiting, by operation of the SATA target circuit, receipt from each of the one or more STP initiator devices in the first portion of either a Register H2D FIS comprising an RLE command from the STP initiator device or a Register H2D FIS having a Soft Reset (SRST) bit set.

18. The method of claim 17
wherein the step of clearing further comprises:
  responsive to receipt of the Register H2D FIS comprising the RLE command, performing the steps of:
    discarding, by operation of the SATA target circuit, the received Register H2D FIS comprising the RLE command; and
    transmitting, by operation of the SATA target circuit, an SDB FIS having an error indicator cleared and a PIO Setup FIS and a Register Device to Host (D2H) FIS comprising an RLE command to the STP initiator device, and
  responsive to receipt of the Register H2D FIS having the SRST bit set, performing the steps of:
    discarding, by operation of the SATA target circuit, the Register H2D FIS having the SRST bit set; and
    transmitting, by operation of the SATA target circuit, a Register D2H FIS comprising a Device Signature to the STP initiator device.

* * * * *